United States Patent [19]

Corth et al.

[11] 4,099,090

[45] Jul. 4, 1978

[54] FLUORESCENT LAMP HAVING A LONGITUDINAL STRIPE OF PHOSPHOR ON OUTER ENVELOPE SURFACE WITH REFLECTOR LAYER THEREOVER

[75] Inventors: Richard Corth, Nutley; Joseph W. Sausville, Glen Rock, both of N.J.

[73] Assignee: Westinghouse Electric Corp., Pittsburgh, Pa.

[21] Appl. No.: 806,397

[22] Filed: Jun. 14, 1977

[51] Int. Cl.² .................. H01J 61/35; H01J 61/48
[52] U.S. Cl. .................................. 313/487; 313/113; 313/493
[58] Field of Search ............... 313/487, 493, 485, 113, 313/111

[56] References Cited

U.S. PATENT DOCUMENTS

| | | | |
|---|---|---|---|
| 2,424,454 | 7/1947 | Gordon | 313/487 |
| 3,767,956 | 10/1973 | Bauer | 313/113 X |

Primary Examiner—Palmer C. Demeo
Attorney, Agent, or Firm—W. D. Palmer

[57] ABSTRACT

Luminescent material, the performance of which is impaired when directly exposed to the environment of a fluorescent lamp discharge, is carried in the form of a longitudinally disposed stripe on the exterior surface of an elongated fluorescent lamp envelope. Carried over the stripe is a layer of reflective material which can be either specular or diffusing. The exterior luminescent material stripe is selected to convert shorter wavelength radiations generated by the conventional inorganic phosphor material which is coated onto the envelope interior surface into longer wavelength visible radiations. The reflector directs substantially all radiations impinging thereon back through the envelope and the resulting blended radiations provide light suitable for purposes of illumination, with additional desired longer wavelength visible radiations.

13 Claims, 2 Drawing Figures

FLUORESCENT LAMP HAVING A LONGITUDINAL STRIPE OF PHOSPHOR ON OUTER ENVELOPE SURFACE WITH REFLECTOR LAYER THEREOVER

BACKGROUND OF THE INVENTION

This invention relates to fluorescent lamps and, more particularly, to fluorescent lamps which incorporate exteriorly coated luminescent material to provide additional desired longer wavelength visible radiations.

Discharge devices which utilize organic phosphor or luminescent material are known and are described in U.S. Pat. No. 2,177,701 dated Oct. 31, 1939 to Fonda. U.S. Pat. No. 4,001,628 dated Jan. 4, 1977 to Ryan discloses a fluorescent lamp wherein longer wavelength visible radiations are supplied by organic phosphor which is disposed in a predetermined pattern, such as a series of polka dots, on the exterior surface of the fluorescent lamp envelope. While the performance of such a lamp is excellent, unless it is utilized in a fixture with a diffusing shield, the red-appearing phosphor polka dots have been reported as aesthetically bothersome to some people.

SUMMARY OF THE INVENTION

The basic lamp comprises a low-pressure positive-column discharge device of the fluorescent type which comprises a sealed, elongated, radiation-transmitting envelope having electrodes operatively disposed proximate the ends thereof and enclosing a discharge-sustaining filling. The electrodes are adapted to have an energizing potential applied thereto to sustain a radiation-generating discharge therebetween. In accordance with the present invention, there is provided finely divided, preselected inorganic phosphor means which is carried on the interior envelope surface and the interior inorganic phosphor is responsive to the radiations generated by the discharge to generate radiations which display a less-than-desired percentage of relatively long wavelength visible radiations. Preselected phosphor means, the performance of which is impaired when directly exposed to the environment of a fluorescent lamp discharge, is carried on the outer envelope surface as a stripe which is longitudinally disposed along the elongated envelope dimension and occupies only a predetermined proportion of the outer surface of the elongated envelope. The exteriorly carried phosphor is operable to convert at least some of the radiations which are generated by the interiorly carried inorganic phosphor into visible radiations of relatively longer predetermined wavelengths. The phosphor stripe is present in a predetermined amount in order to provide a predetermined operational performance for conversion of the shorter wavelength radiations generated by the interiorly carried inorganic phosphor layer into longer wavelength visible radiations. An additional reflector overlays the exteriorly carried phosphor, and the reflector is operable to reflect at least a substantial portion of the total radiations impinging thereon to direct these radiations back through the lamp envelope. The resulting blend of light has additional desired longer wavelength visible radiations.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

Figure 1:
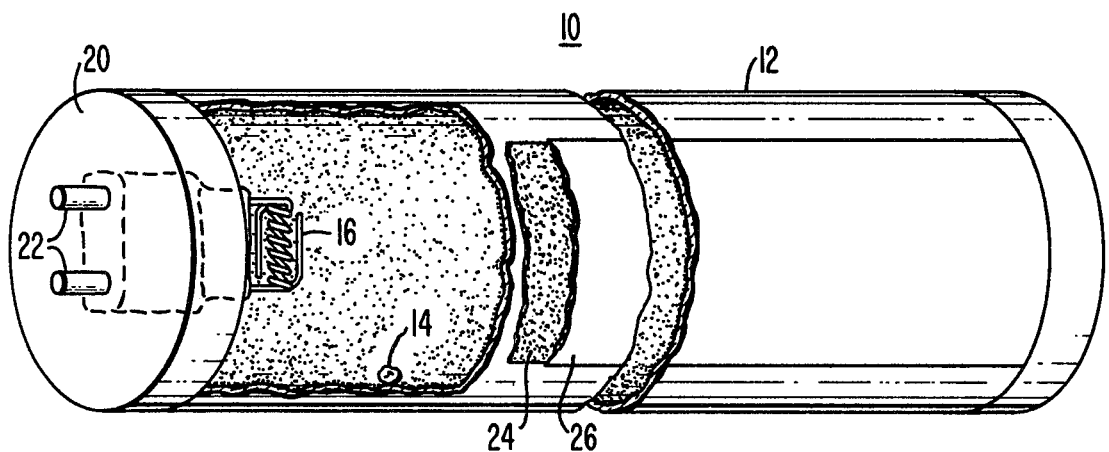
FIG. 1 is an isometric view of a fluorescent lamp, shown partly in section, which carries inorganic phosphor on the envelope interior surface and additional fluorescent material on the envelope exterior surface, applied as a stripe with an overlaying reflector layer, in accordance with the present invention.

With specific reference to the form of the invention illustrated in the drawings, the lamp 10 is of the low-pressure, positive-column fluorescent type comprising an elongated visible-radiation-transmitting glass envelope 12 which encloses a discharge-sustaining filling comprising a small charge of mercury 14 and a small charge of inert starting gas, such as four torrs of argon. Electrodes 16 are operatively positioned within the envelope proximate the ends thereof and adapted to sustain therebetween an operating discharge which generates ultraviolet radiations to which the envelope 12 is substantially opaque. Inorganic phosphor means 18 is carried on the interior surface of the envelope 12 and is operable to convert ultraviolet radiations generated by the operating discharge into longer wavelength radiations of predetermined wavelengths. The construction of the lamp as described hereinbefore is generally conventional and base caps 20 are affixed to the envelope ends and support base pins 22 to facilitate electrical connection to a power source.

The lamp as described in the aforementioned U.S. Pat. No. 4,001,628 performs very well, especially in a recessed type fixture with a translucent shield where the generated longer wavelength visible radiations are substantially diffused by the shield. When the bare lamp is viewed, however, the organic phosphor which is coated onto the exterior surface of the envelope, preferably as small red-appearing polka dots, can be objected to from an aesthetic viewpoint by some users.

Figure 2:
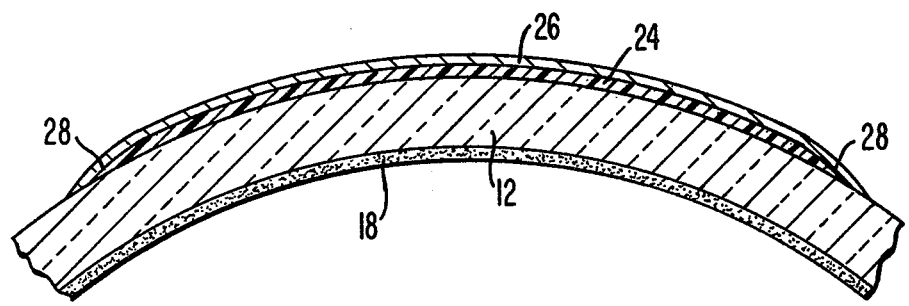
FIG. 2 is an enlarged, fragmentary, sectional view of a portion of the fluorescent lamp envelope as shown in FIG. 1 illustrating the envelope, the interior inorganic phosphor layer, the exterior phosphor stripe, and the overlaying reflector layer.

In accordance with the present invention, and as shown more clearly in FIGS. 1 and 2, the organic phosphor is applied to the outer surface of the envelope 12 as a stripe 24 which is longitudinally disposed along the elongated dimension of the envelope 12. In the case of a tubular envelope which has a circular cross-section, the stripe will have the cross-sectional configuration of a circular arc. The actual dimensions of the stripe will vary depending upon the amount of longer wavelength visible radiations which are desired and as a practical matter, the dimensions of the stripe can vary so that the circular arc described by the cross-section thereof will subtend an angle of from about 10° to about 180° in the case of a general service type lamp. The organic phosphors which can be used to form the layer or stripe 24 are generally known in the art and are described in detail in "Pigment Handbook", Volume I, Wyley & Sons (1973), pages 891 through 903, Chapter by R. W. Voedisch, titled "Luminescent Pigments, Organic". Such organic phosphors do have several limitations as compared to the conventional inorganic phosphors which are used with fluorescent lamps. For example, the organic phosphors are not stable enough chemically to be placed inside of a discharge lamp envelope since they break down under the intense ultraviolet which is present. The organic phosphors tend to bleach upon prolonged exposure to the light and, in addition, they are subject to cross-excitation. In explanation, cross-excitation means that the fluorescence of one organic phosphor can be absorbed by another organic phosphor which has a longer fluorescence wavelength. As a result, the fluorescence from mixtures of organic phosphors do not therefore follow a simple additive relationship, but consist primarily of the fluorescence of the longest emitted wavelength present in the mixture.

In accordance with the present invention, the organic phosphor material or means 24 is positioned to occupy only a predetermined proportion of the outer surface of the envelope in order to intercept only a predetermined proportion of the total radiations passing through the envelope. In this manner, radiations intercepted by the organic phosphor will be converted at least in part to longer wavelength radiations and those radiations which are not intercepted by the organic phosphor will be passed through the envelope in an unaltered fashion and blended with the longer wavelength radiations generated by the organic phosphor to produce light suitable for purposes of illumination. To overcome the problem of bleaching, which is customary with organic phosphors, the stripe 24 is applied in a relatively thick fashion, as explained in the aforementioned U.S. Pat. No. 4,001,628. Thus by providing the stripe with a predetermined thickness, it will have a predetermined operational life for conversion of shorter wavelength visible radiations generated by the inorganic phosphor means 18 into longer wavelength visible radiations.

An additional reflector 26 is provided to overlay the organic phosphor stripe 24. Preferably the reflector 26 slightly overlaps the longitudinal edge portions 28 of the stripe 24. If the reflector does not slightly overlap the edge portion 28, the resulting operating lamp will tend to display red lines along both longitudinal side edges 28 of the reflector 26. The reflector or reflector means 26 is operable to reflect at least a substantial portion of the total radiations impinging thereon and to direct these radiations back through the lamp envelope where they are blended with the remaining radiations generated by the lamp to provide light which is suitable for illumination. As a specific example, the reflector coating 26 overlaps the phosphor layer 24 by an amount sufficient that the overlapping portion on either side of the phosphor layer subtends an angle of about five degrees of circular arc. The amount of overlap can be increased or decreased as indicated by the application. The resulting emitted light is so blended that the lamp as directly viewed has the appearance of a standard fluorescent lamp. The appearance of the lamp when not energized is also similar to the usual fluorescent lamp.

As a specific example, the inorganic phosphor means which is carried as a layer 18 on the interior surface of the envelope is a mixture of divalent europium-activated strontium chloroapatite and manganese-activated zinc silicate and both of these phosphors are known in the art. The chloroapatite emits in the blue when excited by the ultraviolet radiations generated by the discharge and the silicate emits in the green when excited by the radiations generated by the discharge, and the two phosphors are mixed in total amount of 7 grams, in the case of a 40WT12 size envelope, with the relative weight proportions being 15% chloroapatite and 85% silicate.

The organic phosphor stripe 24 can be formed of any suitable organic phosphor means which has the desired fluorescence, and as an example, the organic fluorescent material is rhodamine B dissolved in toluene-sulfonamide resin applied in a pattern to occupy 135° of circular arc, as viewed in cross-section. The stripe can be applied to a thickness of about 75 microns. With such a lamp, the blue emitting chloroapatite inorganic phosphor will have its emission principally confined to the wavelength ranges of from 430 nm to 485 nm and the green-emitting silicate will have its emission principally confined to the wavelength range of from 515 nm to 570 nm. The organic rhodamine B as dissolved in the indicated resin is primarily responsive to the green emissions and has its emission principally confined to the wavelength range of from 588 nm to 630 nm.

As another example, U.S. Pat. No. 3,937,998 dated Feb. 10, 1976 discloses a three component blend which utilizes a relatively expensive matrix activated by trivalent europium as a red-emitting component. In accordance with the present invention, the organic stripe 26 can be used to replace this expensive red-emitting inorganic phosphor, with the resulting attendant advantages in cost savings.

While rhodamine B is an excellent fluorescent dye, any of the other indicated materials as specified in the foregoing "Pigment Handbook" reference can be used if they have the color of fluorescence which is desired, which preferably is orange-to-red for applications such as the present one. As pointed out in this Handbook publication, fluorescent dyes must be in dilute solution in order to fluoresce and exceeding an optimum concentration results in a quenching of fluorescence due to molecular collisions, readsorption of emitted light, and other processes. It is preferred to freeze these solutions to a rigid glass-like material and this intensifies the fluorescence and also increases the resistance to fading or bleaching.

In applying the organic phosphor material as a stripe, the pigment is first formed such as by dissolving 1% by weight of rhodamine B in toluene-sulfonamide resin, with the resulting glass-like material ground to finely divided state. The formed pigment is then applied to the desired substrate by any of several techniques which are generally known, such as spraying or printing as an ink. In the case of the ink, water-soluble acrylics can be used as binders. Also, the pigment can be melted and applied directly from the melt. While a representative thickness is 75 microns, the thickness of the organic stripe can vary considerably such as from 25 to 250 microns, for example.

In applying the reflector coating, it can be made specular by depositing aluminum thereon in accordance with the teachings of U.S. Pat. No. 3,932,780, dated Jan. 13, 1976. Alternatively, the coating can be made nonspecular by spraying thereover white diffusing paint which has a base of titanium dioxide, using suitable masks to define the area to be painted. Such paints are readily commercially available. Alternatively, the organic stripe and overlaying reflector coating can be preformed and then applied to the finished lamp.

Reflector-type fluorescent lamps have been marketed for many years wherein a longitudinal stripe reflector of titanium dioxide is coated onto the interior surface of the envelope, with the conventional phosphor coated thereover. While the overall light output of such lamps is slightly less than the conventionl lamps which do not use the reflector, the light directly below the lamp is of increased intensity, and this has utility in certain types of fixtures, such as those of the egg crate type since much less light is directed toward the ceiling. Lamps of the present invention exhibit the same advantages as these known reflector-type lamps, in addition to the increased longer wavelength visible radiations which are produced.

When dual base pins are utilized, it is necessary to orient the stripe so that when the lamp is mounted in its fixture, the stripe will be positioned along the top surface of the installed lamp. Since reflector type lamps have been marketed for many years with a titanium dioxide coating on the inner surface of the upper portion of the lamp, this constitutes no problem with respect to manufacture or installation.

The present organic stripe and overlaying reflector need not be used with lamps which are designed to emit radiations as three components which are then blended to produce light suitable for illumination. As a specific example, a lamp which is coated with a halophosphate can be modified by incorporating the present stripe and reflector in order to provide more desirable longer wavelength radiations, so that the resulting blend of radiations will be warmer in appearance and the flesh tones and general color appearance of objects illuminated by the resulting lamps will be improved. With such an embodiment, a typical organic phosphor stripe and reflector coating will subtend about 90° of circular arc.

The present organic stripe and reflector coating lamp can also be used to fabricate a so-called aperture lamp, such as are used in duplicating equipments. With such an embodiment, the typical organic stripe will subtend about 330° of circular arc.

The configuration of the envelope need not be tubular as shown in the preferred embodiment. As a specific example, the elongated envelope can be oblong. Alternatively, the envelope can be tubular with a dimpled configuration, as is used in conjunction with some types of higher powered fluorescent lamps.

Organic fluorescent materials as considered hereinabove will deteriorate when exposed to ultraviolet; that is, their performance is impaired when they are exposed to the environment enclosed by the envelope of an operating fluorescent lamp. Most inorganic phosphors, in contrast, are relatively stable in the presence of ultraviolet radiations and/or mercury. There are exceptions, however, and the inorganic sulfides are a notable example. These are very efficient phosphors and are extensively used in cathode ray tubes, but cannot be used as a practical matter as an interior phosphor coating in fluorescent lamps. In accordance with the present invention, inorganic phosphors which display impaired performance when exposed to short wavelength ultraviolet radiations and/or mercury or mercury ions can be coated or applied as a stripe onto the exterior surface of a fluorescent lamp envelope, with a reflective layer carried thereover, in a manner similar to the organic phosphors. As a specific example, calcium sulfide activated by europium and tin plus chlorine is excited by radiations extending from the near ultraviolet through the green to provide a red-orange emission. More specifically, for a 40 watt T12 fluorescent lamp envelope, approximately two grams of this phosphor are adhered to the envelope using a clear acrylic as an adhesive, with the circular arc subtended by the stripe extending through 135°. The envelope will pass the near ultraviolet (330 nm and longer) and this will also excite the sulfide to provide the desired longer visible wavelength radiations. The specified amount of phosphor applied as a stripe as described will provide good performance for conversion of the radiations impinging thereon. The reflector coating is applied thereover as described hereinbefore.

What we claim is:

1. In combination with a low-pressure positive-column discharge lamp comprising a sealed elongated radiation-transmitting envelope having electrodes operatively positioned proximate the ends thereof and enclosing a discharge-sustaining filling, said electrodes adapted to have an energizing potential applied thereto to sustain a radiation-generating discharge therebetween, the improvement which comprises:
    (a) finely divided preselected inorganic phosphor means carried on the interior surface of said envelope, said inorganic phosphor means being responsive to the radiations generated by said discharge to generate radiations which display a less-than-desired percentage of relatively long wavelength visible radiations;
    (b) preselected additional phosphor means, the performance of which is impaired when such additional phosphor means is exposed to the environment enclosed by said envelope of said discharge lamp as operated, said additional phosphor means carried on the outer surface of said envelope as a stripe longitudinally disposed along the elongated dimension of said envelope and occupying only a predetermined proportion of the outer surface of said elongated envelope, said additional phosphor means operable to convert at least some of the radiations generated by said interiorly positioned inorganic phosphor means into visible radiations of relatively longer predetermined wavelengths, and said additional phosphor means stripe present in predetermined amount to provide a predetermined performance for conversion of said shorter wavelength radiations generated by said interiorly positioned inorganic phosphor means into said longer wavelength visible radiations; and
    (c) reflector means overlaying said additional phosphor stripe, and said reflector means operable to reflect at least a substantial portion of the total radiations impinging thereon back through said lamp envelope, whereby additional desired longer wavelength visible radiations are added to the total light output from said lamp.

2. The lamp combination as specified in claim 1, wherein said envelope has a tubular configuration, and the cross-sectional configuration of said stripe is that of a circular arc.

3. The lamp combination as specified in claim 2, wherein said circular arc subtends an angle of from about 10° to about 180°.

4. The lamp combination as specified in claim 3, wherein said reflector means overlaps the longitudinal edge portions of said additional phosphor means stripe.

5. The lamp combination as specified in claim 4, wherein said additional phosphor means is inorganic phosphor means, and said inorganic phosphor means is present in predetermined weight to provide for efficient conversion of radiations generated by said interiorly carried inorganic phosphor means into said longer wavelength visible radiations.

6. The lamp combination as specified in claim 4, wherein said additional phosphor means is organic phosphor means, and said organic phosphor means has a predetermined thickness to provide a predetermined operational life for conversion of radiations generated by said interiorly carried inorganic phosphor means into said longer wavelength visible radiations.

7. The lamp combination as specified in claim 3, wherein a pair of base pins extend from either end of said envelope to facilitate electrical connection to said lamp electrodes, and said additional phosphor means stripe is so oriented with respect to said base pins that when said lamp is installed in a horizontal orientation, said stripe can be positioned on the top surface of said envelope.

8. The lamp combination as specified in claim 3, wherein said reflector means is specular.

9. The lamp combination as specified in claim 3, wherein said reflector means is white and diffusing.

10. The lamp as specified in claim 6, wherein said interiorly carried inorganic phosphor means emits visible radiations which do not include as large a proportion of orange-to-red radiations as desired, and said additional organic phosphor means is selected to convert relatively short wavelength visible radiations into radiations of an orange-to-red color.

11. The lamp as specified in claim 10, wherein the total light output from said lamp is white light suitable for purposes of illumination.

12. The lamp as specified in claim 11, wherein said interiorly carried inorganic phosphor means is a mixture of blue-emitting phosphor and green-emitting phosphor, and said additional organic phosphor means is selected to convert relatively short wavelength visible radiations into radiations of an orange-to-red color.

13. The lamp as specified in claim 12, wherein said interiorly carried inorganic phosphor means has its emission principally confined to the wavelength ranges of from 430 nm to 485 nm and from 515 nm to 570 nm, and said additional organic phosphor means has its emission principally confined to the wavelength range of from 588 nm to 630 nm.

* * * * *